(12) United States Patent
Chen et al.

(10) Patent No.: US 11,781,901 B2
(45) Date of Patent: Oct. 10, 2023

(54) VIBRATION SENSOR WITH PRESSURE ENHANCEMENT

(71) Applicant: MERRY ELECTRONICS CO., LTD., Taichung (TW)

(72) Inventors: Jen-Yi Chen, Taichung (TW); Chao-Sen Chang, Taichung (TW); Yung-Hsiang Chang, Taichung (TW)

(73) Assignee: MERRY ELECTRONICS CO., LTD., Taichung (TW)

( * ) Notice: Subject to any disclaimer, the term of this patent is extended or adjusted under 35 U.S.C. 154(b) by 451 days.

(21) Appl. No.: 17/167,069

(22) Filed: Feb. 3, 2021

(65) Prior Publication Data

US 2021/0302227 A1    Sep. 30, 2021

Related U.S. Application Data

(60) Provisional application No. 62/994,292, filed on Mar. 25, 2020.

(51) Int. Cl.
*G01H 11/06* (2006.01)
*H04R 19/04* (2006.01)
*H04R 31/00* (2006.01)

(52) U.S. Cl.
CPC ............ *G01H 11/06* (2013.01); *H04R 19/04* (2013.01); *H04R 31/003* (2013.01)

(58) Field of Classification Search
CPC ........ G01H 11/06; G01H 11/08; G01H 17/00; H04R 19/04; H04R 31/003; H04R 1/04; H04R 1/2876; H04R 19/005; H04R 2201/003; H04R 3/00; H04R 31/00; B81B 2201/0257; B81B 2203/0127; B81B 2203/0315; B81B 2203/04; B81B 2207/012; B81C 1/0023
See application file for complete search history.

(56) References Cited

U.S. PATENT DOCUMENTS

| 2017/0111721 A1* | 4/2017 | Miehl | H04M 1/035 |
| 2018/0058915 A1* | 3/2018 | Mögelin | H04R 19/005 |

(Continued)

FOREIGN PATENT DOCUMENTS

| CN | 108513241 A | * | 9/2018 | G01H 11/06 |
| CN | 208386931 U | * | 1/2019 | G01H 11/06 |

(Continued)

*Primary Examiner* — David L Singer
(74) *Attorney, Agent, or Firm* — CKC & Partners Co., LLC

(57) ABSTRACT

A vibration sensor includes a support board, a circuit board housing, a metal housing, a pressure-enhancing member and a sensor. The circuit board housing is located on a surface of the support board, and defines a first hollow chamber together with the support board. The metal housing is located on another surface of the support board, and defines a second hollow chamber together with the support board. The pressure-enhancing member is in one of the first and second hollow chambers. The sensor is in the other one of the first and second hollow chambers. The support board has a first through hole and a second through hole. The first through hole is misaligned with the pressure-enhancing member and the sensor. The second through hole is aligned between the pressure-enhancing member and the sensor. The sensor, support board and diaphragm collectively define a third hollow chamber.

11 Claims, 2 Drawing Sheets

(56) References Cited

U.S. PATENT DOCUMENTS

2019/0335271 A1* 10/2019 Post ........................ H04R 19/04
2022/0182753 A1* 6/2022 Post ........................ H04R 17/02

FOREIGN PATENT DOCUMENTS

| CN | 209314103 U | * | 8/2019 | |
|----|----|----|----|----|
| CN | 209526834 U | * | 10/2019 | |
| CN | 209526836 U | * | 10/2019 | |
| CN | 209526837 U | * | 10/2019 | |
| CN | 209526861 U | * | 10/2019 | |
| CN | 209526879 U | * | 10/2019 | |
| CN | 209526886 U | * | 10/2019 | |
| CN | 209659621 U | * | 11/2019 | |
| CN | 110567663 A | * | 12/2019 | ............ G01H 11/08 |
| CN | 209945545 U | * | 1/2020 | |
| WO | WO-2021031497 A1 | * | 2/2021 | |
| WO | WO-2021031498 A1 | * | 2/2021 | |

* cited by examiner

VIBRATION SENSOR WITH PRESSURE ENHANCEMENT

CROSS-REFERENCE TO RELATED APPLICATION

This application claims priority to Provisional Application Ser. No. 62/994,292, filed Mar. 25, 2020 which is herein incorporated by reference in its entirety.

BACKGROUND

Field of Invention

The present disclosure relates to a sensor, and more particularly, to a vibration sensor.

Description of Related Art

At present, both handheld electronic devices and wearable electronic devices require functions provided by vibration sensors such that the performance requirements for vibration sensors are becoming higher. Therefore, various suppliers are actively seeking solutions for vibration sensors with high signal-to-noise ratio.

SUMMARY

In one or more embodiments, a vibration sensor includes a support board, a circuit board housing, a metal housing, a pressure-enhancing member and a sensor. The circuit board housing is located on a first surface of the support board, and defines a first hollow chamber together with the support board. The metal housing is located on an opposite second surface of the support board, and defines a second hollow chamber together with the support board. The pressure-enhancing member is located in one of the first and second hollow chambers. The sensor is located in the other one of the first and second hollow chambers. The support board has a first through hole and a second through hole. The first through hole is misaligned with the pressure-enhancing member and the sensor, and allows the first hollow chamber and the second hollow chamber to be fluidly communicable. The second through hole is aligned between the pressure-enhancing member and the sensor, wherein the sensor, the support board and the diaphragm collectively define a third hollow chamber.

In one or more embodiments, the first hollow chamber and the third hollow chamber are fluidly non-communicable.

In one or more embodiments, the second hollow chamber and the third hollow chamber are fluidly non-communicable.

In one or more embodiments, the support board is made of insulating material.

In one or more embodiments, the vibration sensor further include metal wires located on a surface of the support board, the sensor is electrically to the circuit board housing via the metal wires.

In one or more embodiments, the support board has a surrounding convex portion, and the diaphragm covers the surrounding convex portion.

In one or more embodiments, the diaphragm covers the second through hole and uncovers the first through hole.

In one or more embodiments, when the support board is a rectangle, and the first through hole is disposed at one corner of the rectangle.

In one or more embodiments, the sensor is a microphone device.

In one or more embodiments, the mass block is not located in the third hollow chamber.

In one or more embodiments, the diaphragm is disposed along a periphery of the support board.

In sum, the vibration sensor disclosed herein includes first, second, and third hollow chambers, and a pressure-enhancing member and sensor are arranged in the first and second hollow chambers. The support board has a first through hole and a second through hole. The first through hole is misaligned with the pressure-enhancing member and the sensor, and enables the first hollow chamber and the second hollow chamber to be fluidly communicable with each other. The second through hole is aligned between the pressure-enhancing member and the sensor, so that the sensor, support board and diaphragm jointly define the third hollow chamber, and the third hollow chamber is an isolated chamber. When the pressure-enhancing member moves, it squeezes the air pressure between the first hollow chamber and the second hollow chamber, and pulls the air pressure of the third hollow chamber. That is, the sensor pulls and pushes the air to enable the third hollow chamber to produce greater changes in air pressure, thereby improving the sensitivity of the vibration sensor and obtaining a sensing signal with a higher signal-to-noise ratio.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
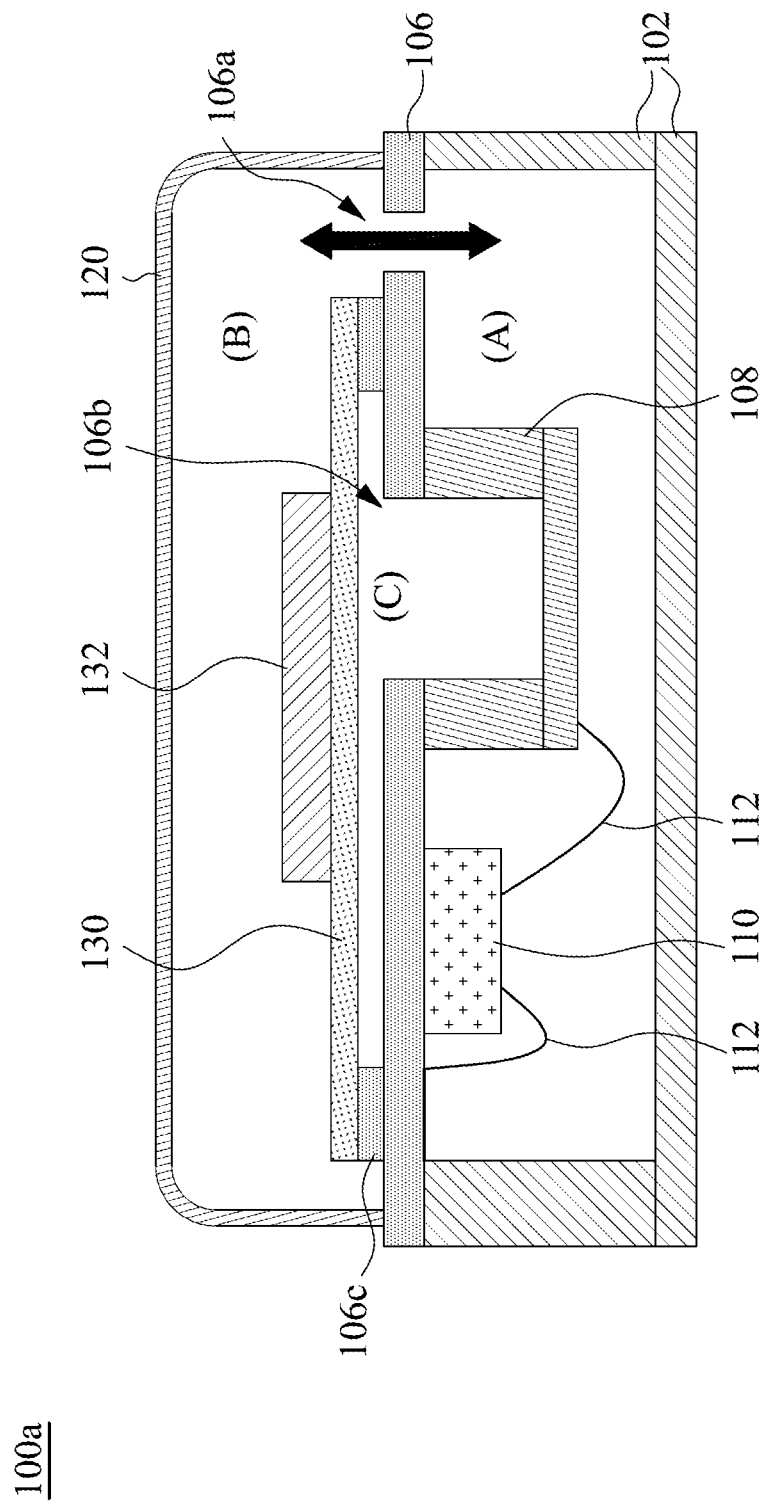
FIG. 1 illustrates a cross-sectional view of a vibration sensor according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, which illustrates a cross-sectional view of a vibration sensor according to one embodiment of the present disclosure. A vibration sensor 100a includes a support board 106, a circuit board housing 102, a metal housing 120, a pressure-enhancing member, and a pressure sensing assembly. The circuit board housing 102 is located on a surface (e.g., a lower surface) of the support board 106, and a periphery of the circuit board housing 102 is connected to a periphery of the support board 106 to jointly define a first hollow chamber (A). The metal housing 120 is located on the other surface (e.g., an upper surface) of the support board 106 that is opposite to the circuit board housing 102, and a periphery of the metal housing 120 is connected to a periphery of the support board 106 to jointly define a second hollow chamber (B). In this embodiment, the support board 106 has a surrounding convex portion 106c, the diaphragm 130 covers the surrounding convex portion 106c, and an area of the diaphragm 130 is smaller than an area of the support board 106, but not being limited thereto.

The pressure-enhancing member includes at least one diaphragm 130 and a mass block 132 fixed on the diaphragm 130. The support board 106 has a surrounding convex portion 106c, and the diaphragm 130 covers the surrounding convex portion 106c. The pressure sensing assembly at least includes a sensor 108 and a control chip 110. When the vibration sensor senses a vibrating wave, the pressure-enhancing member produces associated vibration, and the pressure sensing assembly is used to sense the pressure change caused by a vibration of the pressure-enhancing member. In this embodiment, the sensor 108 is a microphone device, and the control chip 110 is used to receive and process the signal measured by the microphone device.

In this embodiment, the pressure sensing assembly is located in the first hollow chamber (A), and the pressure-enhancing member is located in the second hollow chamber (B), but not being limited thereto.

The support board 106 has a first through hole 106a and a second through hole 106b. The first through hole 106a is misaligned with the pressure-enhancing member (i.e., 130, 132) and the sensor 108, and the first hollow chamber (A) and the second hollow chamber (B) are fluidly communicable with each other via the first through hole 106a. The second through hole 106b is positioned to be aligned between the pressure-enhancing member (i.e., 130, 132) and the sensor 108 such that the sensor 108, the support board 106 and the diaphragm 130 jointly define the third hollow chamber (C). In other words, the diaphragm 130 covers the second through hole 106b, but does not cover (or exposes) the first through hole 106a. In this embodiment, the first hollow chamber (A) and the third hollow chamber (C) are fluidly non-communicable with each other, and the second hollow chamber (B) and the third hollow chamber (C) are fluidly non-communicable with each other. The design of the first, second through holes (106a, 106b) enables the pressure-enhancing member and pressure sensing assembly to obtain more sensitivity and higher signal-to-noise ratio signals after operation.

In this embodiment, the mass block 132 is located in the second hollow chamber (B), but not in the third hollow chamber (C), so that a vibration amplitude of the diaphragm 130 is relatively unrestricted, but not being limited thereto.

In this embodiment, the support board 106 is made of insulating materials, and also includes metal wires 112 that are routed along a surface of the support board 106. Both the control chip 110 and the sensor 108 are electrically connected to the circuit board housing 102 via the metal wires 112. In other embodiments, the control chip can be arranged out of the circuit board housing (e.g., out of the first hollow chamber (A)), and the sensor is electrically connected to the control chip outside the housing via the metal wires, or the control chip can be directly integrated into the sensor.

Figure 2:
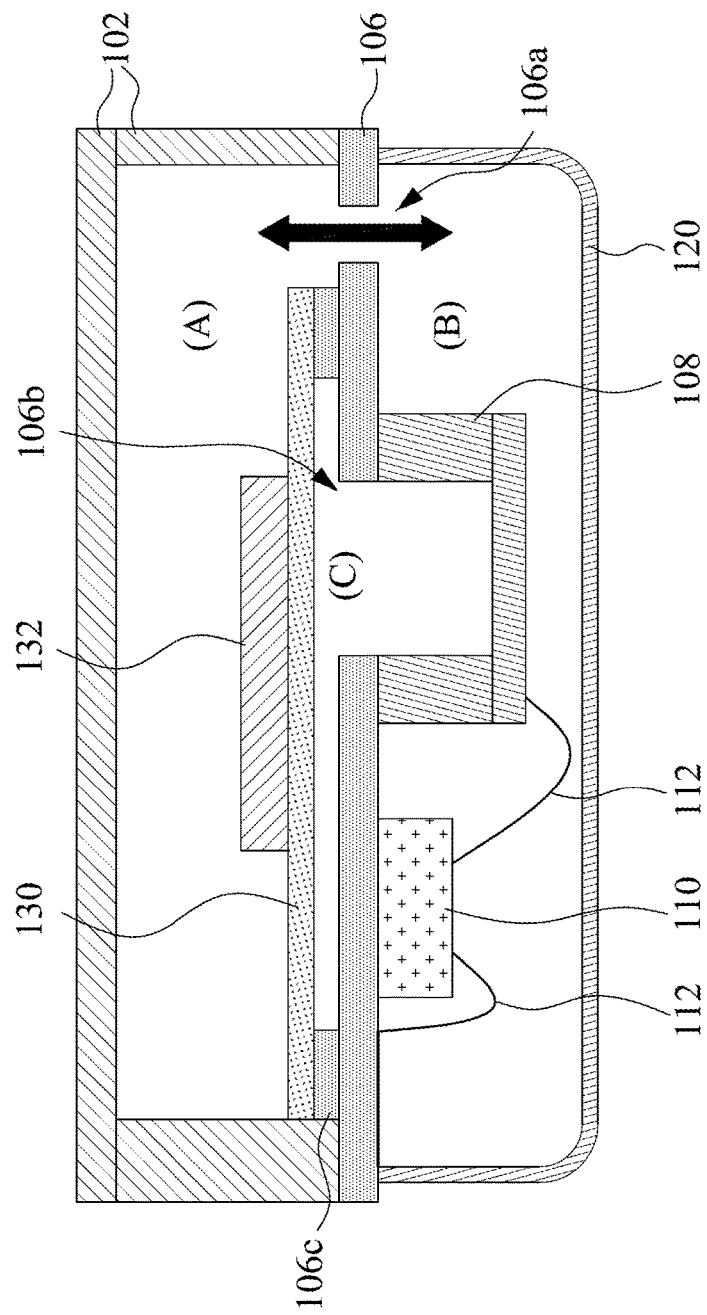
FIG. 2 illustrates a cross-sectional view of a vibration sensor according to another embodiment of the present disclosure.

Reference is made to FIG. 2, which illustrates a cross-sectional view of a vibration sensor according to another embodiment of the present disclosure. The vibration sensor 100b is different from the vibration sensor 100a in positions of the pressure-enhancing member and the pressure sensing assembly. In this embodiment, the pressure-enhancing member is located in the first hollow chamber (A), and the pressure sensing assembly is located in the second hollow chamber (B). Specifically, the diaphragm 130 and the mass block 132 are arranged in the first hollow chamber (A), and the sensor 108 and the control chip 110 are arranged in the second hollow chamber (B). Although a position relationship of the pressure-enhancing member and the pressure sensing assembly is different from the vibration sensor 100a, the first hollow chamber (A) and the third hollow chamber (C) are still fluidly non-communicable with each other, and the second hollow chamber (B) and the third hollow chamber (C) are still fluidly non-communicable with each other. And with the first and second through holes (106a, 106b), the pressure-enhancing member and pressure sensing assembly can still obtain more sensitive sensitivity and higher signal-to-noise ratio signals after operation. In this embodiment, the mass block 132 is located in the first hollow chamber (A) but not in the third hollow chamber (C), so that a vibration amplitude of the diaphragm 130 is relatively unrestricted, but not being limited thereto. In other embodiments, the control chip can be arranged out of the metal housing (i.e., out of the second hollow chamber (B)), and the sensor is electrically connected to the control chip outside the housing via the metal wires, or the control chip can be directly integrated into the sensor.

In another embodiment, the positions of the first and second through holes (106a, 106b), the sensor 108 and the control chip 110 can be such arranged on the support board 106 that when the support board 106 is rectangular, the first through holes 106a are located at a corner of the rectangular support board 106, and misaligned with the diaphragm 130. Specifically, the first through holes 106a are located in a corner area of the support board 106 that is not covered by the diaphragm 130. Furthermore, the diaphragm 130 can be arranged along a periphery of the support board 106 to expand the coverage area of the diaphragm 130 so that the third hollow chamber (C) can generate greater air pressure and increase the sensitivity of the sensor 108.

The vibration sensor disclosed herein includes first, second, and third hollow chambers, and a pressure-enhancing member and sensor are arranged in the first and second hollow chambers. The support board has a first through hole and a second through hole. The first through hole is misaligned with the pressure-enhancing member and the sensor, and enables the first hollow chamber and the second hollow chamber to be fluidly communicable with each other. The second through hole is aligned between the pressure-enhancing member and the sensor, so that the sensor, support board and diaphragm jointly define the third hollow chamber, and the third hollow chamber is an isolated chamber. When the pressure-enhancing member moves, it squeezes the air pressure between the first hollow chamber and the second hollow chamber, and pulls the air pressure of the third hollow chamber. That is, the sensor pulls and pushes the air to enable the third hollow chamber to produce greater changes in air pressure, thereby improving the sensitivity of the vibration sensor and obtaining a sensing signal with a higher signal-to-noise ratio.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A vibration sensor comprising:
a support board;

a circuit board housing disposed on a first surface of the support board and defining a first hollow chamber together with the support board;

a metal housing disposed on an opposite second surface of the support board and defining a second hollow chamber together with the support board;

a pressure-enhancing member disposed in one of the first hollow chamber and the second hollow chamber, wherein the pressure-enhancing member comprises a diaphragm and a mass block disposed on the diaphragm; and a sensor disposed in the other one of the first hollow chamber and the second hollow chamber, wherein the support board has a first through hole and a second through hole, the first through hole is misaligned with the pressure-enhancing member and the sensor to allow the first hollow chamber and the second hollow chamber to be fluidly communicable, and the second through hole is aligned between the pressure-enhancing member and the sensor, and wherein the sensor, the support board and the diaphragm collectively define a third hollow chamber.

2. The vibration sensor of claim 1, wherein the first hollow chamber and the third hollow chamber are fluidly non-communicable.

3. The vibration sensor of claim 1, wherein the second hollow chamber and the third hollow chamber are fluidly non-communicable.

4. The vibration sensor of claim 1, wherein the support board is made of insulating material.

5. The vibration sensor of claim 4, further comprising metal wires disposed on a surface of the support board, the sensor is electrically connected to the circuit board housing via the metal wires.

6. The vibration sensor of claim 1, wherein the support board has a surrounding convex portion, the diaphragm covers the surrounding convex portion.

7. The vibration sensor of claim 1, wherein the diaphragm covers the second through hole and uncovers the first through hole.

8. The vibration sensor of claim 1, wherein the support board is a rectangle, and the first through hole is disposed at one corner of the rectangle.

9. The vibration sensor of claim 1, wherein the sensor is a microphone device.

10. The vibration sensor of claim 1, wherein the mass block is not located in the third hollow chamber.

11. The vibration sensor of claim 1, wherein the diaphragm is disposed along a periphery of the support board.

* * * * *